United States Patent [19]
Takai

[11] Patent Number: 5,357,610
[45] Date of Patent: Oct. 18, 1994

[54] METHOD FOR PARALLEL DATA TRANSMISSION USING A SERIAL DATA TRANSMISSION DEVICE

[75] Inventor: Mamoru Takai, Suita, Japan
[73] Assignee: Megasoft Inc., Suita, Japan
[21] Appl. No.: 862,659
[22] Filed: Apr. 1, 1992
[30] Foreign Application Priority Data
  May 27, 1991 [JP] Japan .................. 3-121357
[51] Int. Cl.$^5$ .................................. G06F 13/00
[52] U.S. Cl. ......................... 395/200; 395/275
[58] Field of Search ............ 395/200, 275; 371/49.1
[56] References Cited
U.S. PATENT DOCUMENTS
  3,975,712  8/1976  Hepworth ................. 371/49.1

Primary Examiner—Robert L. Richardson
Attorney, Agent, or Firm—Lowe, Price, Leblanc & Becker

[57] ABSTRACT

A method for parallel data transmission in a system having (i) a modem, (ii) one or more modem status terminals which detect modem status information and are connected to the modem, (iii) one or more modem control terminals which transmit modem control signals and are connected to the modem, and (iv) one or more serial signal output terminals which receive line control signals and are connected to the modem. Data signals are output via the one or more modem control terminals. Signal logic levels of these output data signals are controlled in accordance with the modem control signals. Data signals are also output via the one or more serial signal output terminals. The signal logic levels of these later output data signals are controlled in accordance with the line control signals. Data signals are input via one or more modem status terminals. The signal logic levels of the input data signals are perceived in accordance with the modem status information.

16 Claims, 9 Drawing Sheets

FIG. 3

| A2 | A1 | A0 | |
|---|---|---|---|
| 1 | 0 | 1 | line status register 110 |
| 1 | 1 | 0 | modem status register 116 |
| 0 | 1 | 1 | line control register 106 |
| 1 | 0 | 0 | modem control register 114 |

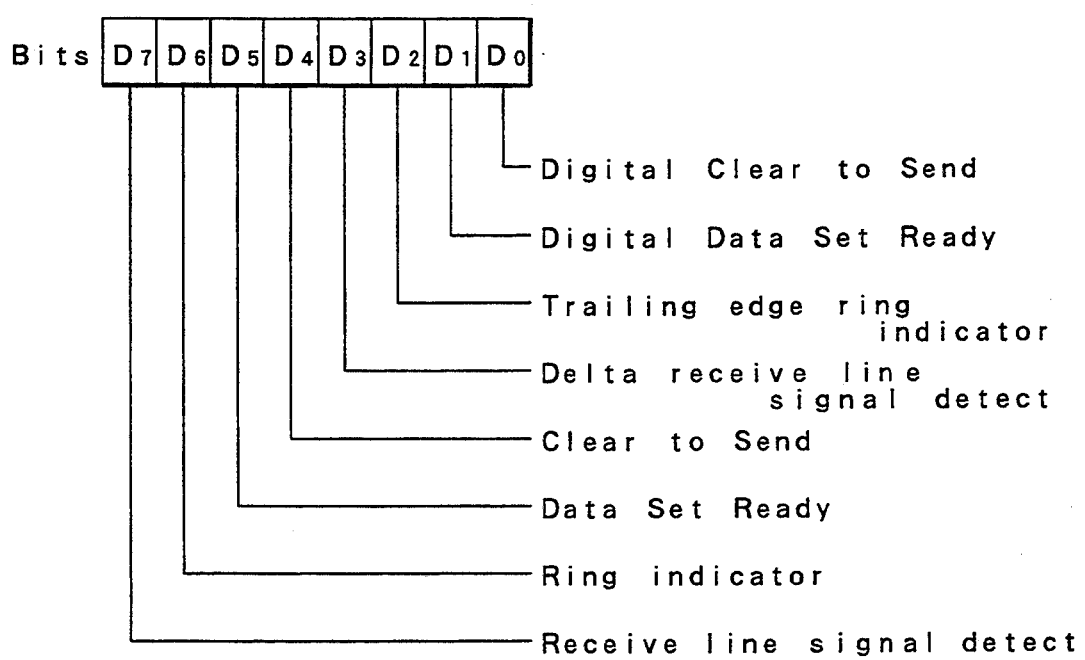

FIG. 6

| Original data | code | Original data | code | Original data | code | Original data | code | Original data | code | Original data | code |
|---|---|---|---|---|---|---|---|---|---|---|---|
| 0 | 1 | 48 | 363 | 96 | 462 | 144 | 556 | 192 | 655 | 240 | 754 |
| 1 | 271 | 49 | 364 | 97 | 463 | 145 | 557 | 193 | 656 | 241 | 755 |
| 2 | 272 | 50 | 365 | 98 | 464 | 146 | 561 | 194 | 657 | 242 | 756 |
| 3 | 273 | 51 | 366 | 99 | 465 | 147 | 562 | 195 | 661 | 243 | 757 |
| 4 | 274 | 52 | 367 | 100 | 466 | 148 | 563 | 196 | 662 | 244 | 761 |
| 5 | 275 | 53 | 371 | 101 | 467 | 149 | 564 | 197 | 663 | 245 | 762 |
| 6 | 276 | 54 | 372 | 102 | 471 | 150 | 565 | 198 | 664 | 246 | 763 |
| 7 | 277 | 55 | 373 | 103 | 472 | 151 | 566 | 199 | 665 | 247 | 764 |
| 8 | 311 | 56 | 374 | 104 | 473 | 152 | 567 | 200 | 666 | 248 | 765 |
| 9 | 312 | 57 | 375 | 105 | 474 | 153 | 571 | 201 | 667 | 249 | 766 |
| 10 | 21 | 58 | 376 | 106 | 475 | 154 | 572 | 202 | 671 | 250 | 767 |
| 11 | 313 | 59 | 377 | 107 | 476 | 155 | 573 | 203 | 672 | 251 | 771 |
| 12 | 314 | 60 | 411 | 108 | 477 | 156 | 574 | 204 | 673 | 252 | 772 |
| 13 | 22 | 61 | 412 | 109 | 511 | 157 | 575 | 205 | 674 | 253 | 773 |
| 14 | 315 | 62 | 413 | 110 | 512 | 158 | 576 | 206 | 675 | 254 | 774 |
| 15 | 316 | 63 | 414 | 111 | 513 | 159 | 577 | 207 | 676 | 255 | 26 |
| 16 | 317 | 64 | 415 | 112 | 514 | 160 | 611 | 208 | 677 | | |
| 17 | 321 | 65 | 416 | 113 | 515 | 161 | 612 | 209 | 711 | | |
| 18 | 322 | 66 | 417 | 114 | 516 | 162 | 613 | 210 | 712 | | |
| 19 | 323 | 67 | 421 | 115 | 517 | 163 | 614 | 211 | 713 | | |
| 20 | 324 | 68 | 422 | 116 | 521 | 164 | 615 | 212 | 714 | | |
| 21 | 325 | 69 | 423 | 117 | 522 | 165 | 616 | 213 | 715 | | |
| 22 | 326 | 70 | 424 | 118 | 523 | 166 | 617 | 214 | 716 | | |
| 23 | 327 | 71 | 425 | 119 | 524 | 167 | 621 | 215 | 717 | | |
| 24 | 331 | 72 | 426 | 120 | 525 | 168 | 622 | 216 | 721 | | |
| 25 | 332 | 73 | 427 | 121 | 526 | 169 | 623 | 217 | 722 | | |
| 26 | 333 | 74 | 431 | 122 | 527 | 170 | 624 | 218 | 723 | | |
| 27 | 334 | 75 | 432 | 123 | 531 | 171 | 625 | 219 | 724 | | |
| 28 | 335 | 76 | 433 | 124 | 532 | 172 | 626 | 220 | 725 | | |
| 29 | 336 | 77 | 434 | 125 | 533 | 173 | 627 | 221 | 726 | | |
| 30 | 337 | 78 | 435 | 126 | 534 | 174 | 631 | 222 | 727 | | |
| 31 | 341 | 79 | 436 | 127 | 535 | 175 | 632 | 223 | 731 | | |
| 32 | 23 | 80 | 437 | 128 | 536 | 176 | 633 | 224 | 732 | | |
| 33 | 342 | 81 | 441 | 129 | 537 | 177 | 634 | 225 | 733 | | |
| 34 | 343 | 82 | 442 | 130 | 24 | 178 | 635 | 226 | 734 | | |
| 35 | 344 | 83 | 443 | 131 | 541 | 179 | 636 | 227 | 735 | | |
| 36 | 345 | 84 | 444 | 132 | 542 | 180 | 637 | 228 | 736 | | |
| 37 | 346 | 85 | 445 | 133 | 543 | 181 | 641 | 229 | 737 | | |
| 38 | 347 | 86 | 446 | 134 | 544 | 182 | 642 | 230 | 741 | | |
| 39 | 351 | 87 | 447 | 135 | 545 | 183 | 643 | 231 | 742 | | |
| 40 | 352 | 88 | 451 | 136 | 546 | 184 | 644 | 232 | 743 | | |
| 41 | 353 | 89 | 452 | 137 | 547 | 185 | 645 | 233 | 744 | | |
| 42 | 354 | 90 | 453 | 138 | 551 | 186 | 646 | 234 | 745 | | |
| 43 | 355 | 91 | 454 | 139 | 25 | 187 | 647 | 235 | 746 | | |
| 44 | 356 | 92 | 455 | 140 | 552 | 188 | 651 | 236 | 747 | | |
| 45 | 357 | 93 | 456 | 141 | 553 | 189 | 652 | 237 | 751 | | |
| 46 | 361 | 94 | 457 | 142 | 554 | 190 | 653 | 238 | 752 | | |
| 47 | 362 | 95 | 461 | 143 | 555 | 191 | 654 | 239 | 753 | | |

F I G. 9

|  | (RTS)<br>74 | (DTR)<br>76 | (TXD)<br>78 |
|---|---|---|---|
| Current combination | 1 | 0 | 1 |
| Data to be transmitted | 0<br>(as it is) | 1<br>(change) | 0<br>(as it is) |
| Changed combination | 1 | 1 | 1 |
| Data to be transmitted | 1<br>(change) | 1<br>(change) | 0<br>(as it is) |
| Changed combination | 0 | 0 | 1 |

METHOD FOR PARALLEL DATA TRANSMISSION USING A SERIAL DATA TRANSMISSION DEVICE

BACKGROUND OF THE INVENTION

1. 1. Field of the Invention

The present invention relates to data transmission, and more particularly to high speed operation thereof.

2. Description of the Prior Art

In general, data communication is performed by parallel data transmission method or serial data transmission method. As to their operation speed, the former is superior to the latest. That is because the parallel data transmission is a communication method wherein data is transmitted in parallel bit form or form of plural bits on transmit lines while the serial data transmission is a communication method wherein serial data is transmitted in bit form on a transmit line. However parallel data transmission requires usually the same number of communication cables as the number of bits of one data and therefore suffers from increase in cost for the cables, particularly when a receiver is great away from a sender.

For the reason, parallel data transmission and serial data transmission are used properly according to kind of sender and receiver. In personal computer, the same is being done. For example, data communication between a central processing unit (CPU) and a hard disk or between the CPU and a floppy disk is effected by transmitting data in parallel bit form while data communication between the CPU and a modem is effected by transmitting data in serial bit form.

So far there has been no idea wherein parallel data transmission is performed using device for serial data transmission. Specifically, a personal computer is provided with terminal connectors for parallel data communication and serial data communication. These all terminal connectors for parallel data communication are usually filled with cables for data communication between the CPU and a printer or a floppy disk. Therefore, data communication between two personal computers must be performed using a terminal connector for serial data communication. That is, usual data communication therebetween is performed by serial data transmission method and involves disadvantage of low operation speed.

SUMMARY OF THE INVENTION

Therefore, it is a primary object of the present invention to provide a method for transmitting data in parallel bit form using device for serial data transmission.

A method for data communication in accordance with the present invention is a method for parallel transmitting data using a device for serial data transmission comprising at least one modem status terminal provided for connecting with a modem, detecting a status information from the modem, at least one modem control terminal provided for connecting with the modem, controlling the modem, at least one serial signal output terminal provided for connecting with the modem, from which serial data is outputted, modem status register provided for holding incoming signal from the at least one modem status terminal as modem status information, modem control register provided for holding incoming modem control signal for controlling signal level from the at least one modem control terminal and controlling signal levels therefrom according to the modem control signal levels, line control register provided for holding incoming line control signal for controlling signal level from the at least one serial signal output terminal and controlling signal levels therefrom according to the line control signal, the line control signal including break signal on which signal level from the at least one serial signal output terminal depend, processing means for receiving the modem status signal from the modem status register and sending the modem control signal and the line control signal to the modem control register and the line control register respectively;

wherein the at least one modem control terminal and the at least one serial signal output terminal are used as data output, the at least one modem status terminal is used as signal input, the processing means send the modem control signal to the modem control register in order to control signal level from the at least one modem control terminal, the processing means send the break signal to the line control register in order to set signal level from the at least one serial signal output terminal high or low, and the processing means receive signal from the modem status register in order to perceive signal level from the at least one modem status terminal.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 is a table showing which combination of signal levels on control lines 25 selects a desired register according to an embodiment of the present invention.

FIG. 5 is a illustration showing 8-bit binary data bits stored in the modem status register 116 and its respective inputs.

FIG. 6 is an encoding table used in the data transmission method.

FIG. 9 is a drawing for showing the detail of the method of transmitting data by changing the current signal level combination.

DETAILED DESCRIPTION OF THE EMBODIMENTS

Figure 1:
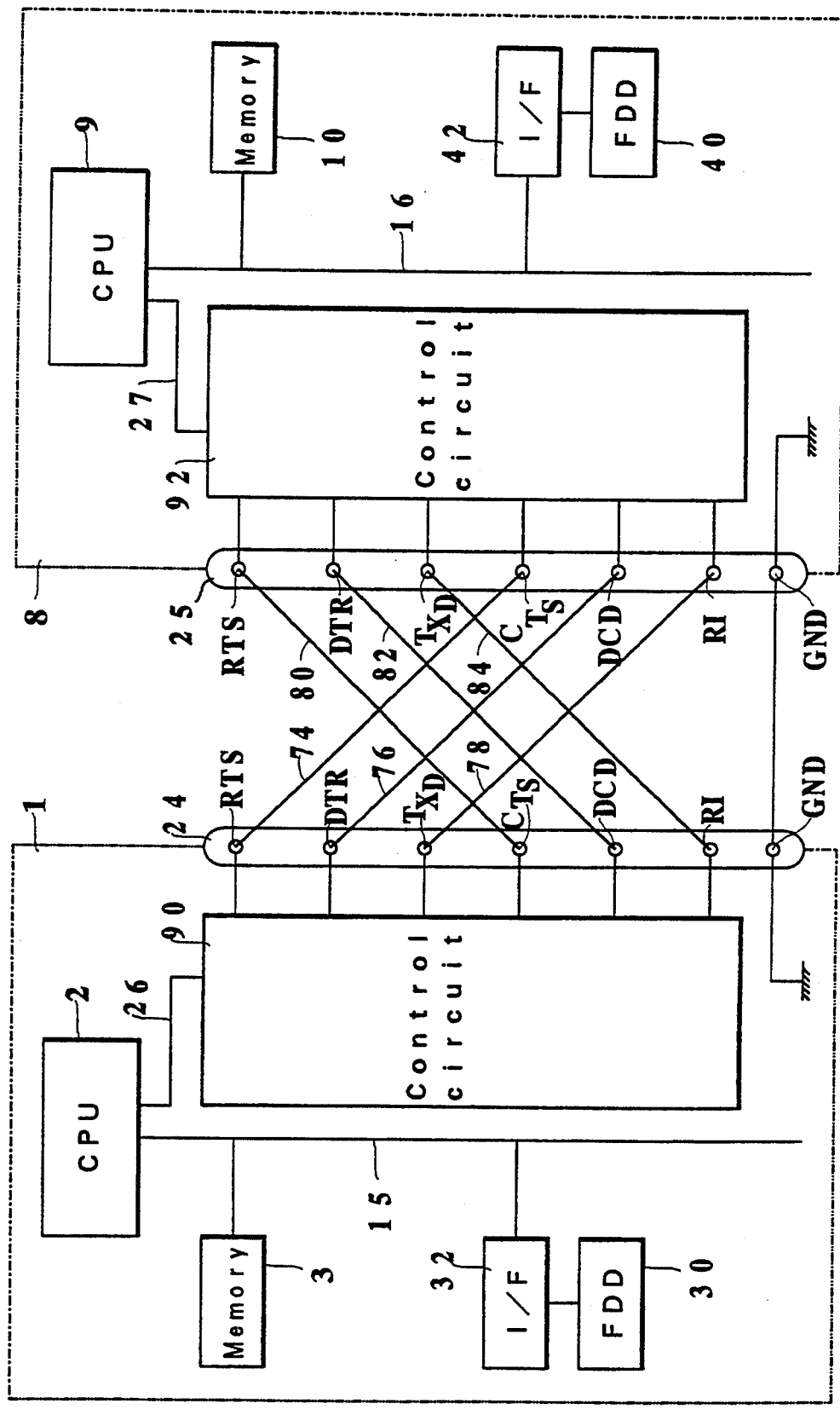
FIG. 1 is a schematic block diagram showing connecting two personal computer for data transmission according to an embodiment of the present invention.

FIG. 1 shows connecting two personal computer for data transmission according to an embodiment of the present invention in a schematic block diagram. In the figure, personal computers 1 and 8 are provided with CPUs 2 and 9 which are the above-mentioned processing means and terminal connectors 24 and 25 for RS-232C serial data transmission, respectively. These terminal connectors 24 and 25 each includes a serial signal output terminal TXD from which serial data is outputted to a modem connecting therewith, modem control terminal labeled RTS and DTR which are provided for controlling a modem connecting therewith and also includes modem status terminals labeled CTS,DCD and RI which are provided for detecting status information from a modem connecting therewith.

The personal computer 1 and the personal computer 8 are connected through the terminal connector 24 and the terminal connector 25 with a cable therebetween as shown FIG. 1. That means the terminals RTS, DTR and TXD of the terminal connector 24 are connected with the terminals CTS,DCD and RI of the terminal connector 25 respectively while the terminals RTS, DTR and TXD of the terminal connector 25 are connected with the terminals CTS,DCD and RI of the terminal connector 24 respectively. The CPUs 2 and 9 control the control circuits 90 and 92 via data bus 15 and 16 and control lines 26 and 27 respectively, so that the circuit 90 can output data at the terminals RTS,DTR and TXD and the circuit 92 can receive data at the terminals CTS,DCD and RI, respectively. These control circuits 90 and 92 are the same as circuits for RS-232C serial interface in their function. It should be noted that the terminals RTS and DTR provided for connecting with a modem interface are used as data outputs herein. Similarly, the terminals CTS and DCD provided for connecting to modem interface are used as data inputs herein.

Figure 2:
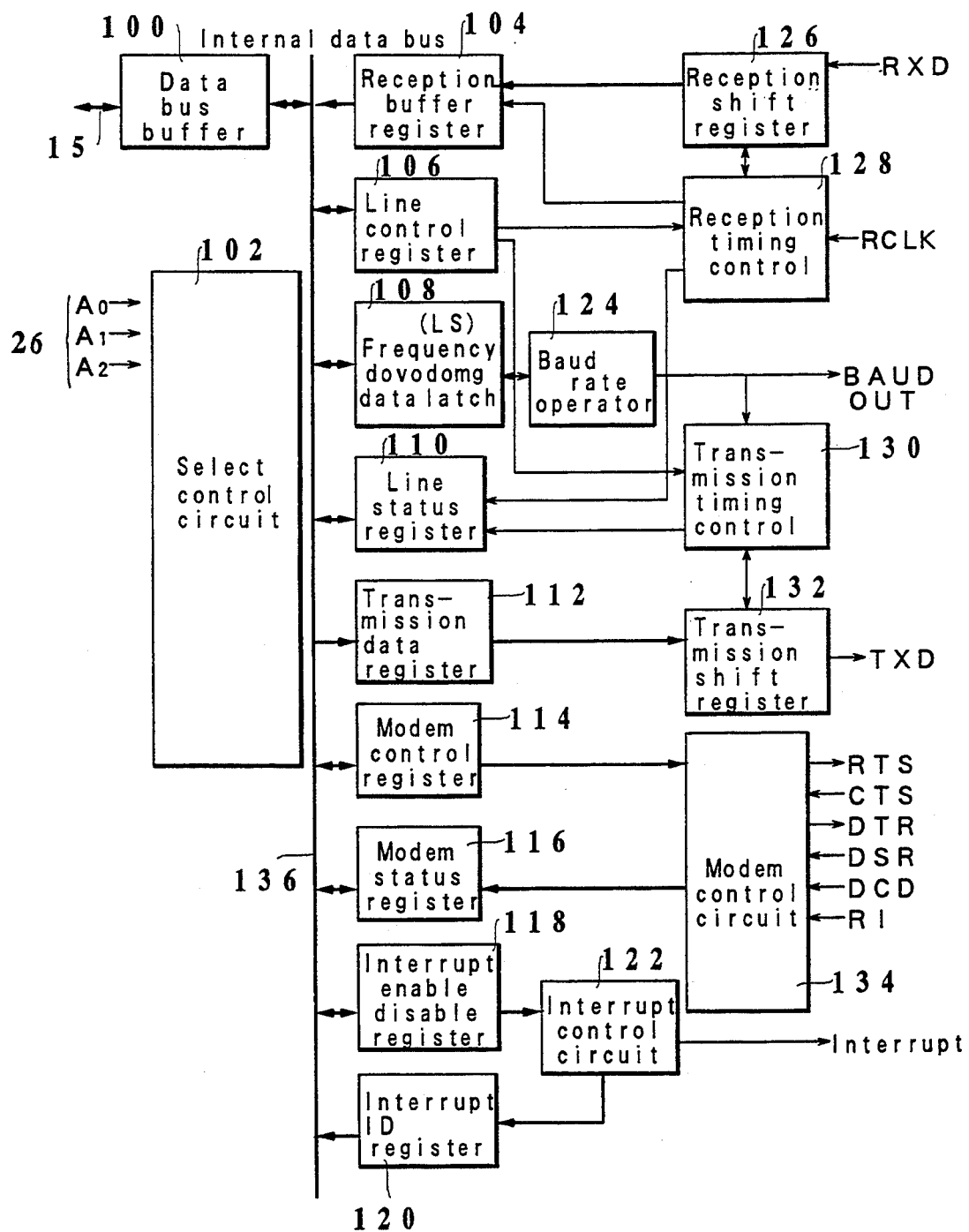
FIG. 2 is a schematic block diagram showing the detail of a control circuit 90 according to an embodiment of the present invention.

FIG. 2 shows the detail of a control circuit 90 in a schematic block diagram. The control circuit 90 comprises an internal data bus 136 connecting with a data bus buffer 100. The data bus buffer 100 is connected with the data bus 15 from the CPU 2. The CPU 2 can exchange data with the internal data bus 136 via both the data bus 15 and the data bus buffer 100.

The control circuit 90 further comprises many kinds of register 104,106,108,110,112,114,116,118 and 120 which all connects with the internal data bus 136. For the CPU 2 to exchange data with any one of registers, the CPU 2 at first applies a combination of select signal levels to a select control circuit 102. In response of this, the select control circuit 102 enables the CPU 2 to exchange data with an appointed register. FIG. 3 shows which combination of signal levels on control lines 26 selects a desired register in a table. According to this table, when a combination "A0,A1,A2" of signal levels on control lines 26 is a combination data "1,1,0" the CPU 2 selects a line control register 106 to exchange data therewith. Note that the above-described binary level values "0" and "1" mean low logic signal level and high logic signal level, respectively.

Figure 4A:
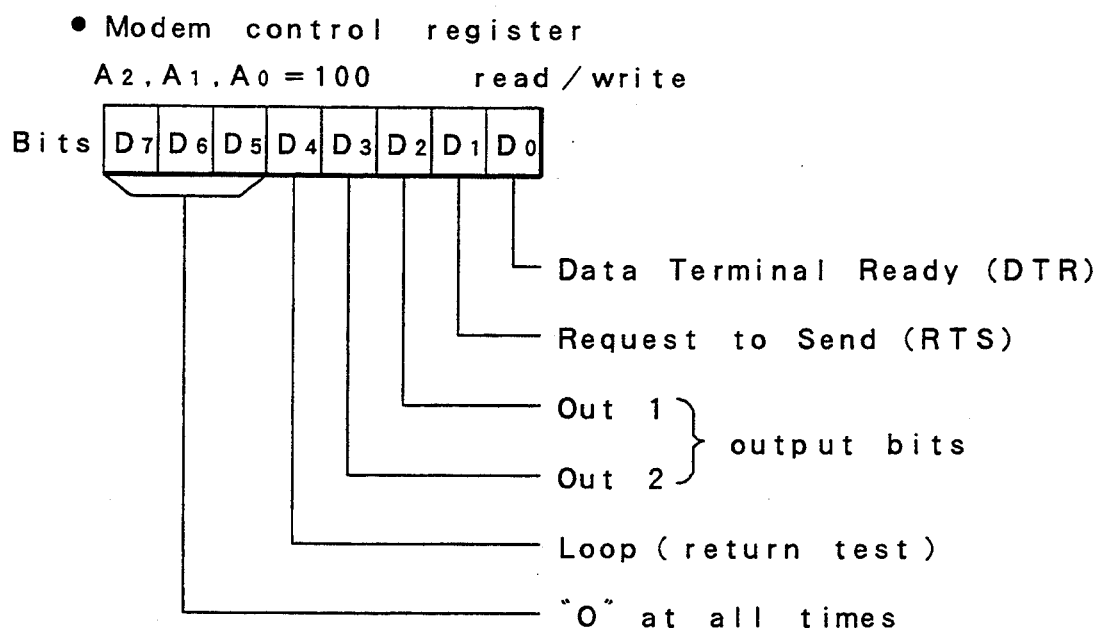
FIGS. 4(a) and 4(b) are illustrations showing control command bits from the modem register 114 and its respective functions in a illustration according to an embodiment of the present invention.

Turning now to FIG. 2, the modem control register 114 is used for controlling a modem control circuit 134 with control data bits stored therein. FIG. 4 shows control command bits from the modem control register 114 and its respective functions in a illustration. As shown in FIG. 4, the lowest bit of the data controls the signal level from the output RTS of the control circuit 134 and also the second lowest bit of the data controls the signal level from the output DTR of the control circuit 134. Specifically, when the lowest bit is at high logic level or at low logic level, the signal level of the output RTS became high level or low level, respectively. Also, when the second lowest bit is at high logic level or at low logic level, the signal level of the output DTR become high level or low level, respectively.

For example, in setting the signal levels of the outputs RTS and DTR, high and low, respectively process operations of the CPU 2 will be described below. First, the CPU 2 controls signal levels on the three control lines 26 and thereby applies a combination "001" of the signal levels to the select control circuit 102 in order to select the modem control register 114. At that time, the CPU 2 can write a 8-bit binary control data "000000010" into the modem control register 114 via both the data bus 15 and the data bus buffer 100. The modem control register 114 with this written data "0000010" can set signal levels of the outputs RTS and DTR, high and low, respectively.

Figure 4B:
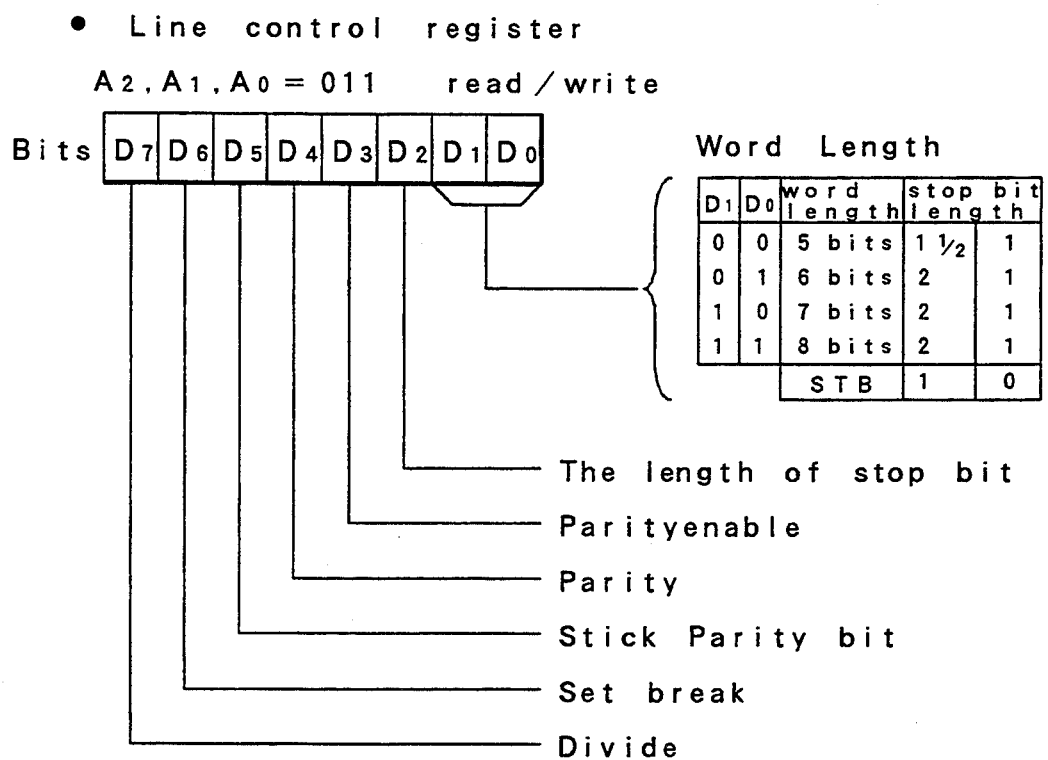

A line control register 106 shown in FIG. 2 provided for controlling the level of transmitted data (TXD) signal on the line 78 is capable to storing a desired control 8-bit data as shown FIG. 4B. FIG. 4B further shows bits of the control data and its respective order. For example, the signal level on the lines 78 depends on the second upper bit D6 of the control data stored in the line control register 106. That is, when the second upper D6 bit is at high logic level or at low logic level, the signal level on the line 78 become high level or low level, respectively. The second upper bit D6 is set by a break signal which is one of line control signals. That is, the second upper bit D6 is set high with the break signal and low without the break signal.

As is described above, the CPU 2 can control the signal logic level of each output RTS, DTR and TXD.

In receiving side, there will be described a detecting operations involved when the CPU 9 detect the signal logic level of each input CTS,DCD and RI. To detect these signal logic levels, the modem status register 116 need selecting by the CPU 2. FIG. 5 illustrates 8-bit binary data bits stored in the modem status register 116 and its respective inputs. As shown in the FIG. 5, the first upper data bit depends on signal level of the input DCD. That is, when the signal level of the input DCD is at high level or low level the first upper data bit becomes high or low, respectively. Similarly, the signal level of the input RI means the second upper data bit and the signal level of the input CTS means the fourth upper data bit. More specifically, the CPU 2 controls the control circuit 102 via the control line 26 in order to select the modem status register 116. The CPU 2 then read out data stored therein via both the data buffer and the data line 15. Thus the CPU 2 acknowledges the signal logic level of each input DCD,CTS and RI. Alternatively, a terminal DSR of the terminal connector 24 may be used as one of these three inputs.

The control circuit 92 is the same as the control circuit 90 in construction and operation.

The above description shows that the CPUs can control the three inputs and the three outputs so that data can be transmitted in 3-bit parallel form from the sender to the receiver. This data transmission attains high speed operation thereof.

Though, in above description, two registers is used as modem control register and line control register one register may act as both modem control register and line control register.

Now an example of data transmission operation using a system constructed as mentioned above will be described hereafter assuming that a computer 1 act as a sender and a computer 8 act as a receiver. Turning to FIG. 1, three communication lines 74, 76 and 78 which connect the two computer is used for passing data from the sender to the receiver while three communication lines 82, 84 and 86 which connect the two computer is used for passing data from the receiver to the sender.

A floppy disk (not shown) having data to be transmitted is inserted into a floppy disk drive (FDD) 30 and a floppy disk (not shown) in which the data is to be stored is inserted into a floppy disk drive (FDD) 40. In sending side, the CPU 2 read data out of the floppy disk through an interface 32. Noted that one character of this original data is composed of eight bits.

A coding table as shown in FIG. 6 is stored in each of memories 3 and 10. This coding table stored in the memory 3 is used for obtaining a numerical code corresponding to each of $2^8$ original data. For example, according to the table an original data is "$(00000000)_2$" i.e. "0" in decimal notation, is encoded into a numerical code is "1", and also an original data is "$(00010011)^2$" i.e. "19" in decimal notation, into a numerical code is "323".

Alternatively, there may be used any other coding table which be fabricated so as to satisfy with the flowing three requirements:

1. Value of each figure in numerical code ranges from 1 to $2^m-1$ (Noted that a figure m means the number of parallel data bits).
2. No longer numerical code begins with figures corresponding to a valid short code.
3. Original data which is supposed to occur frequently are encoded into short numerical code.

Figure 7:
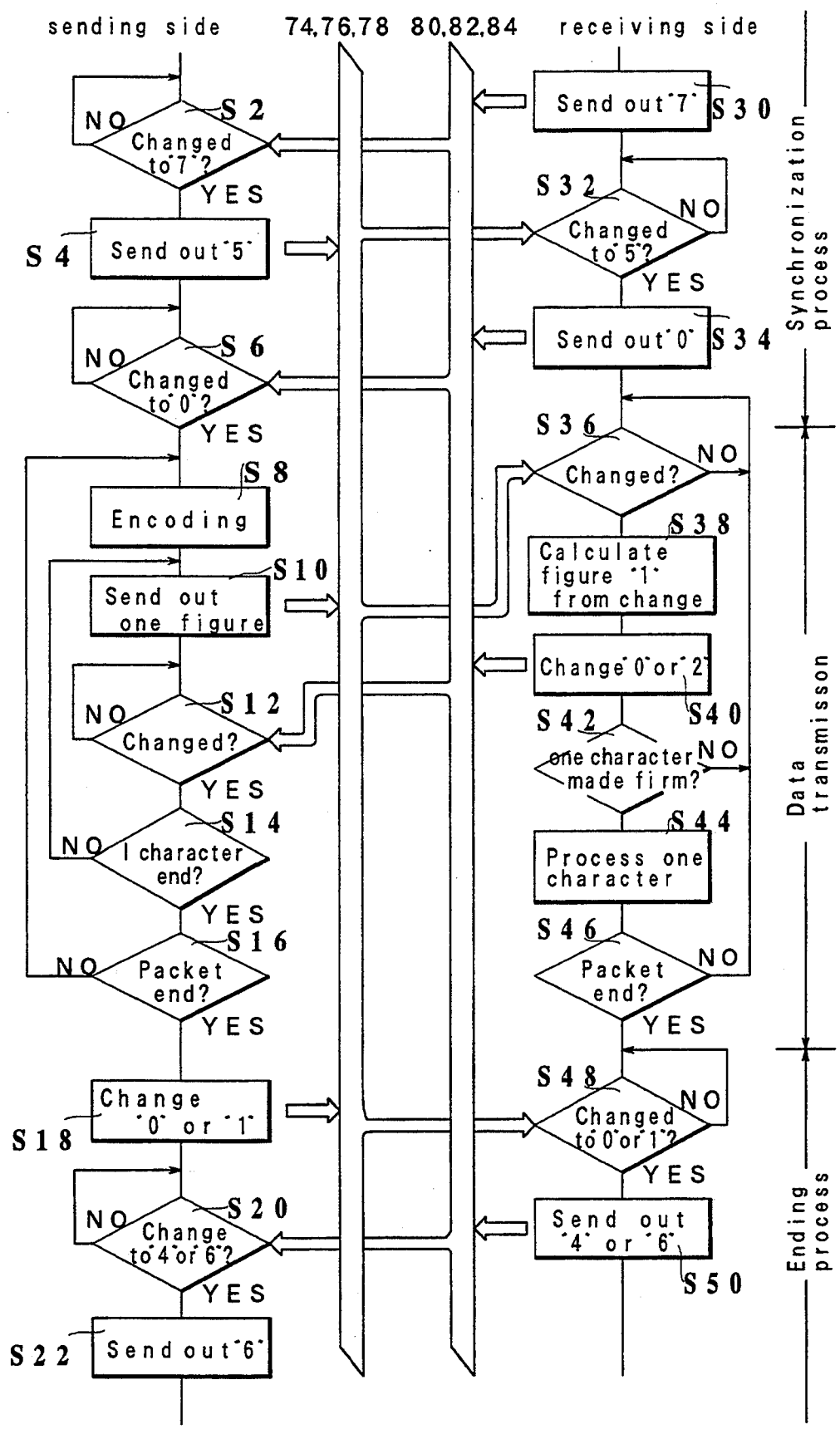
FIG. 7 is a flow chart showing an example of the data transmission according to the present invention.
Figure 8:
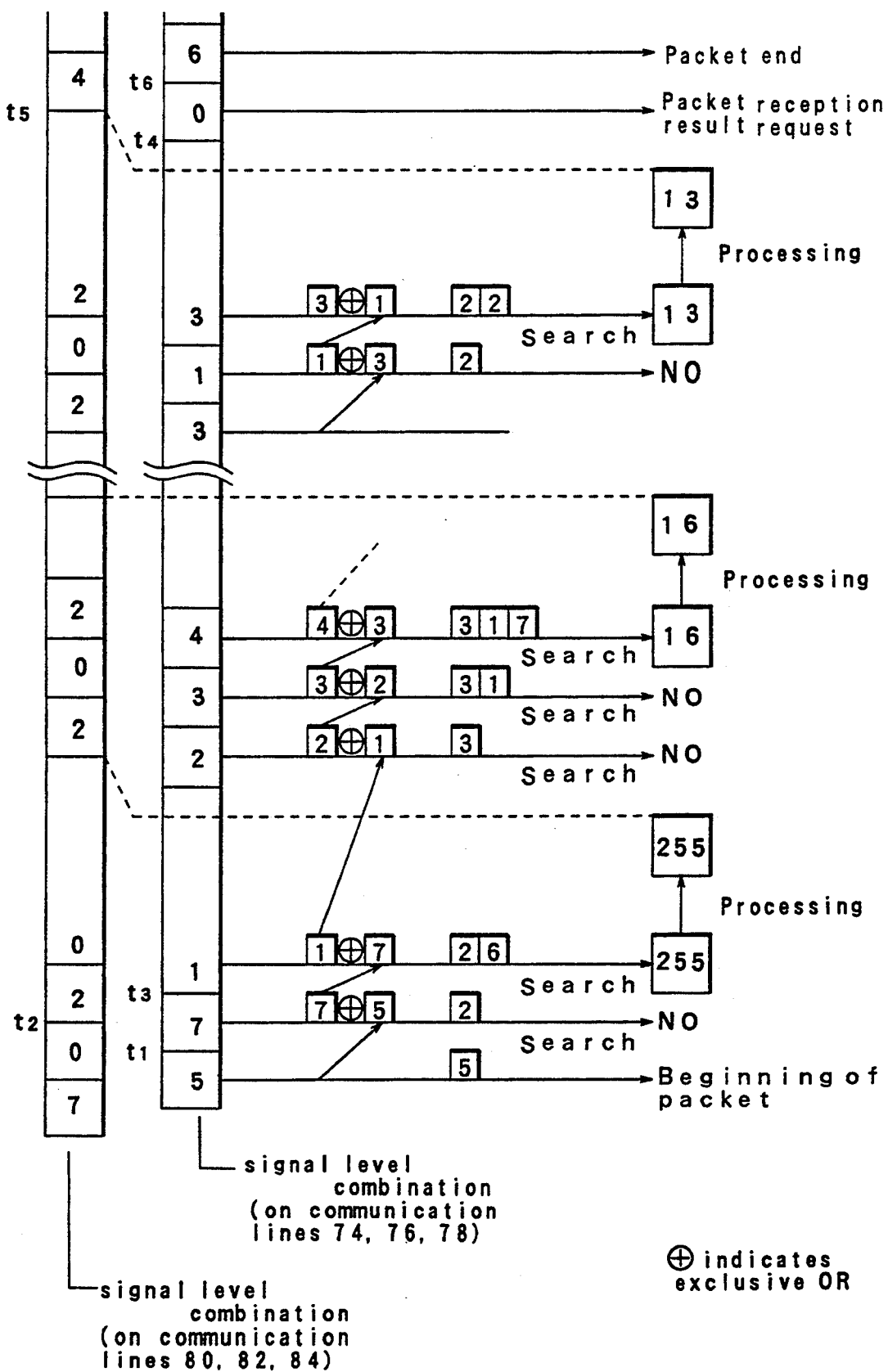
FIG. 8 is a data chart showing data communication between the sender and the receiver.

The requirement 2 allows to do without a stop bit signal. FIG. 7 is a flow chart showing the example of the data transmission and FIG. 8 is a data chart showing data communication between the sender and the receiver. Operation steps according to a method for transmitting data in the example will be described below with reference to the FIGS. 7 and 8. In this example, original data are to be transmitted to the receiver in one packet form.

At the step S30 of receiving side, under control of the CPU 9, signal levels on the three data lines 80,82 and 84 is set in a level combination "111" in order to transmit a three 3-bit data "111" for a parallel data word "7" to the sender. Noted that the upper bit, the middle bit and the lower bit of signal level combination are assigned to the signal levels on the data lines 74,76 and 78 as well as the data lines 80,82 and 84, respectively. Accordingly, that means all of signal levels on the data lines 80,82 and 84 is set high. In the sending side, detecting the data word "7" (at the step S2) the CPU 2 signals a order to send back a parallel data word "5" by setting a combination of signal levels on the three data lines 74,76 and 78 to "110+ (at the step S4). Detecting the data word "5", the CPU 9 can perceives that the sender is ready to send data to the receiver and then send back a parallel data word "0" by setting a combination of signal levels on the three data lines 74,76 and 78 to "000". Detecting the data word "0" the CPU 2 can perceives that the receiver is ready to detect data. These steps result in establishing synchronization of the sender and the receiver to begin data transmission therebetween.

Thereafter under control of the CPU 2, a 8-bit data to be transmitted is encoded into an numerical code through a memory 13 in which a coding table is stored (at the step S8). Specifically, when an actual data to be transmitted is a 8-bit data "11111111" (255 in decimal number) it is encoded into a numerical code "26" according to this coding table.

Then, under control of the CPU 2, only the first figure "2" of the code "26" encoded as described above is send to the CPU 9. This is effected not by setting a combination of three signal logic levels in above-mentioned manner but by changing the current signal level combination into a signal level combination according to a result of exclusive OR in 3-bit form between the figure "2" to be sent and the present code data "5". Referring now to FIG. 9, the 3-bit data "010" shows the current code data "5" and the 3-bit data "101" shows the figure data "2" to be send. Accordingly, the result of exclusive OR of these two 3-bit data is "111" in 3-bit form. Specifically, the current combination "101" of the signal levels on the three data lines 74,76 and 78 changes into "111" in order to send the figure data "2" (at FIG. 8).

In the receiving side, detecting these changes in signal level combination, the CPU 9 can perceives that a code data is sent from the CPU 2 without sampling pulses (at the step S36). As is described above, data transmission of the present invention does not require sampling pulses. That is, the existing signal level combination is to be changed every time one figure in a numerical code is sent. To do this, each of numerical codes is composed of one or more figures value of which ranges from "1" to "$2^3-1$" because, when the sender transmits the figure data "0", the current signal level combination remain as it is. That is, there can be created any numerical codes provided that they are composed of one or more figures ranging from "1" to "$2^3-1$".

Thereafter, under control of the CPU 9, the exclusive OR between the previous combination (3-bit data "101") and the changed current combination (3-bit data "111") is computed, thereby obtaining the figure data "2" to be send (at the step S38). Detecting the figure data "2", the CPU 9 signals a order to change the combination of the signal levels on the three data lines 80,82 and 84 from "000" to "010" (at the step S42 in FIG. 8T2).

In addition, the CPU 9 signals a order to examine whether or not the figure "2" exists in the coding table. In this example, the figure "2" can not be found in this coding table. In that case, the step S36 is supposed to be returned.

In sending side, detecting that change in signal level combination from "000" to "010" the CPU 9 can perceives that the receiving side is ready to detect next figure data (at the step S12 in FIG. 8). The CPU 9, thereafter, examines whether or not all FIGS. 2 and 6 of the numerical code have been sent. In this example, the step S10 is supposed to be returned when all figures of a numerical code have been not sent as yet. Therefore, in receiving side, the remaining figure data "6" is transmitted to the CPU 2 in the above-described manner (at the step S10, see FIG. 9 and FIG. 8). That is, under control of the CPU 2, exclusive OR in 3-bit form between the figure "6" to be sent and the present code data "7" is computed and, according to this result, the current combination "111" of the signal levels on the three data lines 74,76 and 78 changed into a signal level combination "001". This signal level combination "001" means a data word "1".

In the receiving side, detecting this change in signal level combination, the CPU 9 can perceives that the second figure data of the code is being sent (at the step 36). Under control of the CPU 9, the exclusive OR between the previous combination "111" of signal levels and the changed current combination "001" of signal levels is computed, thereby obtaining the figure "6" (at the step S38). The CPU 9 combines the first FIG. "2" and the second figure "6" into a code word "26" and then examines whether or not the code word "26" exists in the coding table (at the step 42). In this example, the code word "26" can be found in this coding table. At that time the CPU 9 can encodes the code "26" into the 8-bit data "11111111" (255 in decimal form) to be sent. That is because the coding table is arranged so that no numerical code begins with a code word "26" other than the numerical code "26" (see the requirement 2). While, that explains why the data transmission according to the present invention does not require stop bits. Thereafter, under control of the CPU 9 the decoded 8-bit data "11111111" is written into a floppy disk over the interface 42 (at the step S44).

When one character data has been transmitted to the receiver as described above, the receiving side is supposed to return to the step S36 and the sending side is supposed to return to the step S8, thus getting ready to transmit next one character data.

In sending side, when all character data in the floppy disk have been transmitted to the receiver, the CPU 9 signals order to change the existing combination of signal levels to "000" or "001". In receiving side, detecting this change in the signal level combination, the CPU 9 signals order to change the existing combination of signal levels into "100" or "101" (at the step S50, see FIG. 8). For example, when the CPU 9 judges data transmission has been performed correctly the existing combination of signal levels may be changed into "100" while when the CPU 9 judges data transmission has been performed incorrectly the existing combination of signal levels may be changed into "101". This change in signal level combination enables the sender to deal with error causing incorrect data transmission. For example, the sender carries out data retransmission. While, being not able to detect cause of incorrect data transmission the sender sends back the received combination of signal levels (the 3-bit data "101") as it is. This means the end of the operation steps to transmit data. The operation steps as described above can attain high operation speed.

Even when the CPU 9 plays sending part and the CPU 2 plays receiving part data transmission is able to be preformed in above-described manner.

In the case where a disk floppy in which data to be processed is stored is not inserted into a floppy disk drive because of difference in size, the data communication method according to the present invention is effective in transmitting, at high operation speed, the data stored in the disk floppy to the computer with the floppy disk drive.

It is needless to say that there is a lot of case where the data communication method according to the present invention is effective in transmitting data at high operation speed.

Meanwhile, though the three data lines is used for parallel data transmission in the present example two data lines or four or more data lines may be used therefor.

In the case where a computer plays only a sending part and a computer plays only a receiving part, it may be arranged that the number of data lines for transmit is different from that of communication lines for receipt.

Though data lines 74,76,78,80,82 and 84 which connect two the personal computers, in the abovedescribed example, are make up of wires, wireless means such as light, infrared rays, electric waves and supersonic waves may connect two personal computers.

Though the device for RS-232C standard is, in the present example, utilized for not modem communication but parallel data communication, a device for other standard may be utilized for parallel data communication.

In the above-described example, the method for parallel transmitting data, according to the present invention, using the RS-232C device for serial data transmission is characterized in that the modem control terminals and the serial signal output terminals are used as data output, the modem status terminals are used as signal input, the processing means send the modem control signals to the modem control registers in order to control signal levels from the modem control terminals, the processing means send the break signals to the line control registers in order to set signal levels from the serial signal output terminals high or low, and the processing means receive signals from the modem status registers in order to perceive signal levels from the modem status terminal.

Therefore, parallel data transmission can be performed using device for serial data transmission.

In the above-described example, the method for transmitting data in accordance with the present invention is further characterized in that three terminals out of a terminal for CTS signal, a terminal for DCD signal, a terminal for RI signal and a terminal for DSR signal are used as modem status terminal, a terminal for RTS signal and a terminal for DTR signal are used as modem control terminal and a terminal for signal TXD is used as serial signal output terminal.

Therefore, parallel data transmission can be performed using the device for RS-232C standard.

In the above-described example, the method for transmitting data in accordance with the present invention is further characterized in that one register may act as both modem control register and line control register.

Therefore, the present invention can be used without a complicated device.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for parallel data transmission in a system having (i) a modem, (ii) at least one modem status terminal connected to said modem, (iii) at least one modem control terminal connected to said modem, (iv) at least one serial signal output terminal connected to said modem, (v) a modem status register, (vi) a modem control reqister, (vi) a line control register, and (vii) processing means connected to said at least one modem status terminal, said at least one modem control terminal, said at least one serial signal output terminal, said modem status register, said modem control register, and said line control register, comprising the steps of:

detecting modem status information from said modem with said at least one modem status terminal;

storing said modem status information in said modem status register;

transmitting said modem status information from said modem status register to said processing means;

transmitting modem control signals from said at least one modem control terminal, via said processing means, to said modem control register;

storing said modem control signals in said modem control register;

outputting data signals via said at least one modem control terminal;

controlling signal logic levels of the data signals output from said at least one modem control terminal in accordance with said modem control signals stored in said modem control register;

receiving incoming line control signals, which include break signals, via said at least one modem status terminal;

transmitting said break signal from said at least one modem status terminal, via said processing means, to said line control register;

storing said break signals in said line control register;

outputting data signals via said at least one serial signal output terminal;

controlling signal logic levels of the data signals output from said at least one serial signal output terminal in accordance with said break signals stored in said line control register;

inputting data signals via said at least one modem status terminal; and perceiving signal logic levels of said data signals input via said at least one modem status terminal using said processing means and in accordance with the modem status information transmitted to said processing means.

2. A method for parallel data transmission according to claim 1,
wherein (i) said at least one modem status terminal consists of three terminals including a terminal for CTS signals, a terminal for DCE signals, and a terminal for RI signals, (ii) said at least one modem control terminal consists of a terminal for RTS signals and a terminal for DTR signals, and (iii) said serial signal output terminal is a terminal for TXD signals.

3. A method for parallel data transmission according to claim 1,
wherein one register device serves as both the modem control register and the line control register.

4. A method for parallel data transmission according to claim 2,
wherein one register device serves as both the modem control register and line control register.

5. A method for parallel data transmission according to claim 1, wherein said at least one modem status terminal includes a terminal for DSR signals.

6. A method for parallel data transmission according to claim 1, wherein said modem status register, said modem control register, and said line control register form part of an RS-232C interface.

7. A method for parallel data transmission according to claim 1, wherein said system has a coding table and further comprising the steps of:
transmitting code information from said coding table to said processing means; and
encoding data to be output and decoding data received as input using said transmitted code information.

8. A method for parallel data transmission according to claim 1, further comprising the steps of:
transmitting the data signals output from said terminals by wireless communications means; and
receiving said data signals input via said at least one modem status terminal by wireless communications means.

9. A method for parallel data transmission in a system having (i) a modem, (ii) at least one modem status terminal connected to said modem, (iii) at least one modem control terminal connected to said modem, (iv) at least one serial signal output terminal connected to said modem, and (v) control circuitry connected to said at least one modem status terminal, said at least one modem control terminal, and said at least one serial signal output terminal comprising the steps of:
detecting modem status information from said modem with said at least one modem status terminal;
transmitting said modem status information to said control circuitry;
transmitting modem control signals from said at least one modem control terminal to said control circuitry;
outputting data signals via said at least one modem control terminal;
controlling signal logic levels of the data signals output from said at least one modem control terminal in accordance with said modem control signals transmitted to said control circuitry;
receiving line control signals via said at least one modem status terminal;
transmitting said line control signals from said modem status terminal to said control circuitry;
outputting data signals via said at least one serial signal output terminal;
controlling signal logic levels of the data signals output from said at least one serial signal output terminal in accordance with said line control signals transmitted to said control circuitry;
inputting data signals via said at least one modem status terminal; and
perceiving signal logic levels of said data signals input via said at least one modem status terminal in accordance with the modem status information transmitted to said control circuitry.

10. A method for parallel data transmission according to claim 9, wherein (i) said at least one modem status terminal consists of three terminals including a terminal for CTS signals, a terminal for DCD signals, and a terminal for RI, (ii) said at least one modem control terminal consists of a terminal for RTS signals and a terminal for DTR signals, and (iii) said serial signal output terminal is a terminal for TXD signals.

11. A method for parallel data transmission according to claim 9, wherein said at least one modem status terminal includes a terminal for DSR signals.

12. A method for parallel data transmission according to claim 9, wherein said control circuitry forms part of an RS-232C interface.

13. A method for parallel data transmission according to claim 9, wherein said system has a coding table and further comprising the steps of:
transmitting code information from said coding table to said control circuitry; and
encoding data to be output and decoding data input using said transmitted code information.

14. A method for parallel data transmission according to claim 9, further comprising the steps of:
- transmitting the data signals output from said terminals by wireless communications means; and
- receiving said data signals input via said at least one modem status terminal by wireless communications means.

15. A method for parallel data transmission according to claim 9, wherein said control circuitry includes a processing unit, a modem status register, a modem control register, and a line control register, and said processing unit further comprising transmitting said modem status information, aid modem control signals and said line control signal between an at least one of said registers.

16. A method for parallel data transmission in a system having (i) a modem, (ii) at least one modem status terminal which detects modem status information and is connected to said modem, (iii) at least one modem control terminal which transmits modem control signals and is connected to said modem, and (iv) at least one serial signal output terminal which receives line control signals and is connected to said modem comprising the steps of:
- outputting data signals via said at least one modem control terminal;
- controlling signal logic levels of the data signals output from said at least one modem control terminal in accordance with said modem control signals;
- outputting data signals via said at least one serial signal output terminal;
- controlling signal logic levels of the data signals output from said at least one serial signal output terminal in accordance with said line control signals;
- inputting data signals via said at least one modem status terminal; and
- perceiving signal logic levels of the data signals input via said at least one modem status terminal in accordance with said modem status information.

* * * * *